(12) United States Patent
Chupeau

(10) Patent No.: US 7,127,105 B2
(45) Date of Patent: Oct. 24, 2006

(54) METHOD FOR STOPPING A FRAGMENTATION OF DIGITAL IMAGES

(75) Inventor: Bertrand Chupeau, Rennes (FR)

(73) Assignee: Thomson Licensing, Boulogne-Billancourt (FR)

(*) Notice: Subject to any disclaimer, the term of this patent is extended or adjusted under 35 U.S.C. 154(b) by 474 days.

(21) Appl. No.: 10/067,562

(22) Filed: Feb. 5, 2002

(65) Prior Publication Data

US 2002/0141642 A1 Oct. 3, 2002

(30) Foreign Application Priority Data

Feb. 15, 2001 (FR) .................................. 01 02041

(51) Int. Cl.
*G06K 9/34* (2006.01)
*G06K 9/62* (2006.01)

(52) U.S. Cl. ........................................ 382/173; 382/225

(58) Field of Classification Search ................ 382/164, 382/173, 224, 225
See application file for complete search history.

(56) References Cited

U.S. PATENT DOCUMENTS 5,557,684 A * 9/1996 Wang et al. ................. 382/107
6,141,433 A * 10/2000 Moed et al. ................. 382/103

OTHER PUBLICATIONS

Schütz et al. "Matching Error Based Criterion of Region Merging for Joint Motion Estimation and Segmentation Techniques." Proceedings of the International Conference on Image Processing, vol. 1, Sep. 16-19, 1996 pp. 509-512.*
Smet et al. "Motion-Based Segmentation Using a Thresholded Merging Strategy on Watershed Segments." Proceedings of the International Conference on Image Processing, vol. 2, Oct. 26-29, 1997 pp. 490-493.*
Karczewicz et al. "Motion Estimation and Representation for Arbitrarily Shaped Image Regions." Proceedings of the Internation Conference on Image Processing, vol. 2, Oct. 23-26, 1995 pp. 197-200.*
Moscheni et al. "Spatiotemporal Segmentation Based on Region Merging." IEEE Transaction on Pattern Analysis and Machine Intelligence, vol. 20, Issue: 9, Sep. 1998 pp. 897-915.*
Haris et al. "Hybrid Image Segmentation Using Watersheds and Fast Region Merging." IEEE Transactions on Image Processing, vol. 7, Issue: 12, Dec. 1998, pp. 1684-1699.*

(Continued)

*Primary Examiner*—Vikkram Bali
*Assistant Examiner*—Colin LaRose
(74) *Attorney, Agent, or Firm*—Joseph J. Laks; Ronald H. Kurdyla

(57) ABSTRACT

The invention relates to a method for the fragmentation (F) of images ($14_i$) into homogeneous regions ($R_i$), this fragmentation (F) using iterative merges of fragments $F_i$ and $F_j$ which are as similar as possible according to at least one selection parameter, this similarity being evaluated by a product A*B of two factors A and B, A being consistent with a number of pixels and B being consistent with the selection parameter(s).

Figure 1:
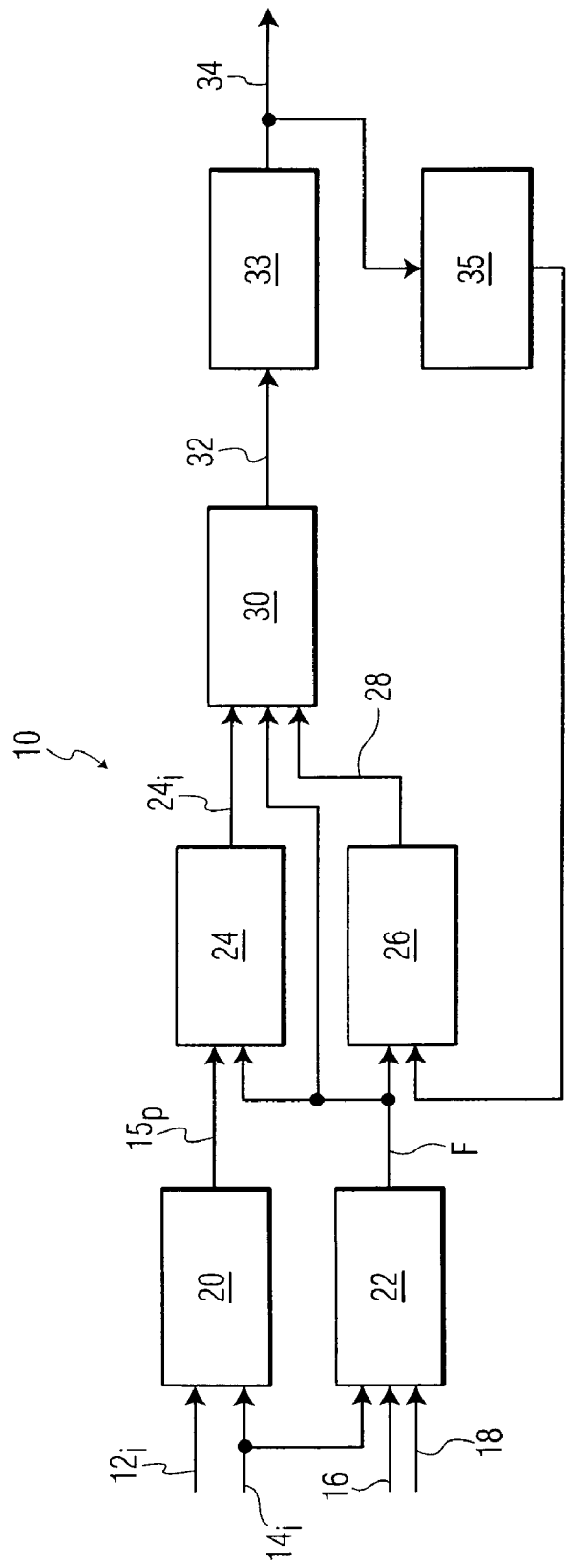

According to the invention a merge is performed when the product A*B*C is less than a threshold consistent with the selection parameter, C being a factor consistent with the inverse of a number of pixels.

19 Claims, 1 Drawing Sheet

OTHER PUBLICATIONS

A.J. Round, et al, "Colour Segmentation for Lesion Classification," Proceedings of the 19th Annual International Conference of the IEEE Engineering in Medicine and Biology Society. Magnificent Milestones and Emerging Opportunities in Medial Engineering, (Cat. No. 97CH36136), Proceedings of the 19th Annual International, pp. 582-585 vol. 2, XP002180583 1997, Piscataway, NJ, USA, IEEE, USA.

B. Chupeau, et al., "Region-Based Motion Estimation for Content-Based Video Coding and Indexing," Visual Communications and Image Processing 2000, Perth, WA, Australia, Jun. 20-23, 2000, vol. 4067, pt. 1-3, pp. 884-893, XP000926306, Proceedings of the SPIE—The International Society for Optical Engineering, 2000, SPIE-Int. Soc. Opt. Eng., USA.

A. Tremeau, et al., "A Region Growing and Merging Algorithm to Color Segmentation," Pattern Recognition, Jul. 1997, Elsevier, UK, vol. 30, No. 7, pp. 1191-1204, XP000926385.

French Search Report dated Oct. 18, 2001.

* cited by examiner

METHOD FOR STOPPING A FRAGMENTATION OF DIGITAL IMAGES

FIELD OF THE INVENTION

The present invention relates to a method for stopping the fragmentation of digital images, in particular within the field of video image compression.

BACKGROUND OF THE INVENTION

To transmit or record digital images, use is commonly made of coding methods which reduce the quantity of information transmitted and, consequently, the bandwidth required for this transmission.

Some of these coding methods call upon segmentation of the images into so-called homogeneous regions, that is to say into regions of uniform character according to one or more criteria such as the chrominance and/or the luminance of the pixels (image elements) of this region.

Subsequently, the transmission of the luminance and chrominance data relating to each pixel of a region can be replaced by a simple transmission of the luminance and chrominance data of the relevant region.

Moreover, this segmentation can be called upon in respect of inter-image coding. Thus, before transmitting or recording the information relating to the state, for example of luminance and chrominance, of a region thus defined, one determines whether this information has already been transmitted or recorded. Stated otherwise, one determines whether this region has already been identified in a previously transmitted image.

If this region has not been identified in an earlier image, all the information relating to this region of the image is transmitted.

Conversely, if this region has been identified during the transmission of a previous image, only a signal representing the displacement of this region with respect to the earlier image is transmitted.

Thus, on reception or on reading, this region is reconstructed from the information already transmitted in respect of a previous image.

For example, consider a series of images all comprising one and the same uniform and stationary blue background. In this case, by considering this blue background to form a single region, the information relating to this region is transmitted only for the first image. Thereafter, the coding of the following images only comprises indications indicating the presence and the location of this region.

Thus, the blue background is recreated for all the images from the information transmitted (or recorded) in respect of the initial image.

A description of a known method of segmenting images is given hereinbelow with the aid of the appended figure.

Represented in this figure are the various steps of a method 10 for the segmentation of images, this segmentation comprising two preliminary operations, one, 20, relating to the luminance and the other, 22, relating to the chrominance or to analogous parameters as described later.

It should be stressed that the operation 22 relating to the chrominance of the pixels is dubbed "fragmentation" while the final partitioning of the image according to criteria of chrominance and of apparent motion of the pixels—described later—is dubbed "segmentation".

The operation 20 comprises the comparison of the luminances of the pixels of a current image $14_i$ with respect to the luminances of the pixels of an earlier image $12_i$. This comparison determines the motions or the variations of luminance of the pixels of the image $14_i$ with respect to the pixels of the image $12_i$.

A so-called "optical flow" vector $15_p$ representative of the motion or of this variation of luminance of this pixel P is thus allocated to each pixel P of the current image $14_i$. To do this, this vector $15_p$ is described by coordinates (dx, dy) characterizing the motion of the image at the pixel P with coordinates (x, y).

During the operation 22, a fragmentation F of the image $14_i$ into fragments $F_1, F_2, \ldots F_N$ based on the colour is performed. To do this, the luminance information $Y_i$ for the image $14_i$ is used, together with the evaluations 16 and 18 of the apportionment of the red and blue colours via respective signals $U_i$ and $V_i$ for each pixel $P_i$ of the image $14_i$.

Thereafter, on the basis of the fragments $F_1, F_2, \ldots F_N$ thus obtained, the final segmentation of the image $14_i$ is obtained by grouping these fragments $F_i$ into parts $R_i$, called regions, according to an operation 30 involving motion parameters—this operation being described later.

There are numerous methods making it possible to perform this fragmentation F of the image into fragment $F_1, F_2, \ldots F_N$ of homogeneous colour—homogeneity being defined according to the quality of fragmentation demanded.

Moreover, it should be noted that other criteria may be used to perform this fragmentation.

For example, the fragmentation can be performed according to a so-called "texture" criterion based on the spatial distributions of the grey levels in the image. To do this, these textures are characterized by criteria of homogeneity, of contrast, of favoured orientation or of periodicity.

In this description, fragmentation based on the merging, pairwise, of neighbouring fragments of similar colour is used. More specifically, on the basis of two so-called "starting" neighbouring fragments, a new so-called "finishing" fragment comprising the two merged fragments is created.

Thereafter, this method is repeated by considering this finishing fragment to be a new starting fragment.

To determine the sequence of merges—a single merge being performed at each step—we calculate a cost $C_{fu}$ associated with each envisageable merge.

This cost $C_{fu}$, the calculation of which is described hereinbelow, is representative of the difference in colour between the two fragments whose merge is envisaged.

Thus, by merging ($F_i \cup F_j$) the fragments $F_i$ and $F_j$ whose cost $C_{fu}$ of merging is the lowest among all the envisaged costs of merging, we merge the fragments which are most similar chrominancewise among all the fragments which may be merged.

In this embodiment, the calculation of the cost $C_{fu}$ of merging between two fragments $F_i$ and $F_j$ is as follows:

$$C_{fu} = \frac{N_i N_j}{N_i + N_j}[(Y_i - Y_j)^2 + (U_i - U_j)^2 + (V_i - V_j)^2]$$

In this formula, $N_1$ is the number of pixels in the fragment $F_i$ and $N_j$ is the number of pixels in the fragment $F_j$ and $(Y_i - Y_j)$, $(U_i - U_j)$ and $(V_i - V_j)$ represent, respectively, the differences in luminance and in colours between the two fragments $F_i$ and $F_j$.

On basis of this merge between the two fragments $F_i$ and $F_j$, a new fragment $F_k = F_i \cup F_j$ comprising the pixels of the two starting fragments $F_i$ and $F_j$ is obtained. This new fragment $F_k$ therefore comprises $N_k = N_i + N_j$ pixels.

This new fragment $F_k=F_i \cup F_j$ is then characterized by a luminance $Y_k$ equal to the mean of the luminances of the merged fragments, weighted by the number of pixels present in each fragment.

More precisely, when merging the fragment $F_i$ with the fragment $F_j$, the new mean luminance of the fragment $F_k$ is equal to:

$$Y_k=(N_i*Y_i+N_j*Y_j)/(N_i+N_j)$$

Likewise, we define the parameters $U_k$ and $V_k$ of colour differences of the new fragment $F_k$ as, respectively:

$$U_k = (N_i*U_i + N_j*U_j)/(N_i+N_j),$$
$$V_k = (N_i*V_i + N_j*V_j)/(N_i+N_j).$$

Each pixel constitutes a starting fragment for the first fragmentation step. Subsequently, the unmerged pixels remain fragments.

However, a minimum number N of fragments is specified so as to stop the segmentation when this number of fragments is reached.

Thus, we obtain N fragments $F_1, F_2, \ldots F_N$ making up the image $14_i$, each of these fragments comprising a given number of pixels $N_1, N_2, \ldots N_N$.

The cost of the merge between $F_1$ and $F_j$ being proportional to $N_i.N_j/N_i+N_j$, if we assume an isotropic commencement of merging, then the bigger the number of pixels concerned in a merge, the higher will be the cost of this merge, thus favouring the merging of small fragments and hence an isotropic fragmentation of the image.

Thereafter, in the course of an operation 24, a parametric model characteristic of the motion of all the pixels of each fragment $F_1, F_2, \ldots F_N$ as previously obtained is estimated.

To do this, each fragment $F_i$ is characterized by a parametric model $24_i$ of motion linked to the horizontal component dx and vertical component dy of the motion vector $15_p$ of each pixel with spatial coordinates (x,y) of the fragment $F_i$.

More precisely, an affine model 24 with 6 parameters (a,b,c,d,e,f) is chosen, such that the components dx and dy of the motion vector $15_p$ of a pixel P with coordinates (x,y) are equal to $$dx=a+b.x+c.y, \quad dy=d+e.x+f.y.$$

Thus, a single model 24 of motion parameters with 6 components describes the motion of all the pixels of the fragment considered.

The parameters a, b, c, d, e and f of the model $24_i$ are determined according to the so-called least squares technique from the motion vectors $15_p$ estimated at each pixel during step 20.

More specifically, on the basis of a starting model $24'_i$ (a',b',c',d',e',f'), its parameters are made to vary in such a way as to minimize a deviation $E_{mo}$ between the "real" vectors $15_p$ and the vectors calculated from this model according to the above formulae.

To evaluate this deviation $E_{mo}$, we calculate the sum of the squares of the differences between the motion vector $15_p$ of each pixel and the vectors reconstructed from the model described previously.

For example, for a vector $15_p$ with coordinates (dx, dy), modelled by a model $24_i$ (a,b,c,d,e,f):

$$E_{mo}=(dx-(a+b.x+c.y))^2+(dy-(d+e.x+f.y))^2.$$

The final parametric model (a,b,c,d,e,f) is obtained when this deviation or "variance" $E_{mo}$ is minimal. This variance in the modelling of the motion of the fragment $F_i$ is then designated as $Var_{24i}$.

Generally, the evaluations described here take no account of so-called "outlying" values, that is to say of values which differ excessively from the globally estimated values.

In parallel, during an operation 26, the fragmentation F can be compared with the segmentation of the previous image $12_i$.

For example, any correspondences 28 between the location of fragments $F_i$ and $F_j$ and the location of a region $R'_i$, are identified, this region $R'_i$ being the final result of the segmentation of the image $12_i$ according to an operation 30 described later.

These correspondences 28 may be used during operations requiring the tracking of object(s) over a series of images, for example in the road traffic field.

Thereafter, during the operation 30, a method of grouping similar to the method of merging described during the operation 22 is performed. Thus, an iterative process is applied involving two neighbouring fragments which minimize a grouping cost $C_{re}$, this grouping creating a new starting fragment.

During this operation 30, the cost of merging is evaluated from the models $24_i$ of motion parameters of each fragment.

Thus, the two fragments grouped together at each step of the operation 30 are the fragments exhibiting the greatest similarity of motion among all the pairs of neighbouring fragments.

For example, by considering two fragments $F_i$ and $F_j$ characterized by respective parametric models $24_i$ ($a_i$, $b_i$, $c_i$, $d_i$, $e_i$, $f_i$) and $24_j$ ($a_j$, $b_j$, $c_j$, $d_j$, $e_j$, $f_j$), the similarity of motion between these two fragments is calculated as follows, where it is assumed that the fragment $F_i$ is of larger size than the fragment $F_j$:

A motion vector $15_{pj/i}$ is calculated for each pixel of the fragment $F_j$ according to the parametric model $24_i$ for the fragment $F_i$. Thus, for a pixel with coordinates ($x_j$, $y_j$) of $F_j$, we calculate the vector $15_{pj/i}$ with coordinates ($dx_{j/i}$, $dy_{j/i}$) according to the following formulae:

$$dx_{j/i}=a_i+b_ix_j+c_iy_j$$

$$dy_{j/i}=d_i+e_ix_j+f_iy_j$$

Thereafter, the motion vector $15_{pj/j}$ of this pixel is evaluated according to the parametric model $24_j$ for this fragment, that is to say $$dx_{j/j}=a_j+b_jx_j+c_jy_j \text{ and}$$

$$dy_{j/j}=d_j+e_jx_j+f_jy_j$$

Finally, the difference between these two vectors $15_{pj/i}$ and $15_{pj/j}$ is evaluated by calculating a difference $\Delta p_{j/i}$ $$\Delta p_{j/i}=(dx_{j/j}-dx_{j/i})^2+(dy_{j/j}-dy_{j/i})^2.$$

The mean of the $\Delta p_{j/i}$ of all the pixels of $F_j$ is then calculated so as to obtain an evaluation $\Delta_{j/i}$ of the difference between the parametric models of the two fragments $F_i$ and $F_j$.

Subsequently, the fragments $F_i$ and $F_j$ whose difference $\Delta_{j/i}$ of motion is less than a predetermined threshold—are grouped together—this threshold being all the smaller the greater the agreement between fragments has to be in order for these fragments to be grouped together.

However, during this grouping operation 30, no new motion parameter 24 is calculated in respect of a fragment created by a grouping. This is because these complex calculations would require overly large durations.

This is why, during this operation 30, a motion vector equal to one of the motion vectors of the two grouped fragments is allocated to each fragment created by a grouping.

In this embodiment, the motion parameter of the grouped fragment of smallest size is allocated to the fragment resulting from the grouping.

For example, we consider the grouping between two fragments $F'_i$ and $F'_j$ such that the number of pixels $N'_i$ of the fragment $F'_i$ is greater than the number $N'_j$ of pixels of the fragment $F'_j$. The calculation is speeded up by allocating a motion vector $24'_k$ equal to the vector $24'_i$ to the fragment $F'_k$ obtained through the grouping of $F'_i$ and of $F'_j$.

These iterative groupings are performed until a specified number of fragments is obtained.

When this grouping operation is completed, a given number of "final" fragments or of regions $R_i$ which characterize the segmentation of the image according to this method is then obtained.

The set of pixels P included in a region $R_i$ is then homogeneous in terms of motion, this parameter being characterized by a unique model $24_i$ for the entire set of pixels of the region $R_i$.

Before transmitting (or recording) this segmentation, a marking operation 33 is then performed, in the course of which the regions making up the image $14_i$ are identified. Thus, when the image $16_i$ posterior to the image $14_i$ is analysed, it will be possible to use this segmentation to undertake the operation 26 with the image $16_i$.

To do this, a last step 35 is required in the course of which this segmentation 35 is assigned a delay corresponding to the lag in the appearance of the next image $16_i$.

As mentioned previously, the fragmentation F of the image into fragments $F_i$ is stopped according to a number-of-fragments-obtained criterion. Thus, when the number of fragments obtained reaches a certain threshold, the merging method stops.

The present invention results from the finding that this stoppage criterion does not yield an optimized result. Specifically, according to this method, the fragmentation of a very simple image produces an excessive fragmentation of the latter while the fragmentation of a complex image—comprising multiple details—produces an inadequate fragmentation.

SUMMARY OF THE INVENTION

The present invention makes it possible to obtain a fragmentation which adapts to the nature of the images.

It relates to a method for the fragmentation of images using an evaluation of the cost of merging between fragments, this cost of merging being of the form cost $(F_i \cup F_j) = A*B$, where A is a term proportional to a colour difference and/or luminance difference and B is a term inversely proportional to a number of pixels, and this method is characterized in that the cost is weighted by a new coefficient C consistent with a number of pixels. Since the cost of a merge can then be evaluated with respect to a colour difference or luminance difference, it is possible to stop a fragmentation when a colour threshold and/or luminance threshold is reached, thus tailoring the fragmentation to the complexity of the image.

In one embodiment, the coefficient C is proportional to $2/N_m$ where $N_m$ represents a mean size of the fragments $F_i$, such as a mean number of pixels per fragment $F_i$.

The selection parameter(s) is (are), for example, at least one of the following parameters: the luminance, the chrominance and the texture.

According to one embodiment, each iterative merge relates only to two neighbouring fragments $F_i$ and $F_j$.

Moreover, the factor A is, in one example, proportional to $$\frac{Ni \times Nj}{Ni + Nj},$$

where $N_i$ and $N_j$ are representative of the size of each merged neighbouring fragment $F_i$ and $F_j$—it being possible for the size of a fragment to be the number of pixels included in this fragment.

According to one embodiment, the factor B is proportional to $[(Y_i-Y_j)^2+(U_i-U_j)^2+(V_i-V_j)^2]$, where $(Y_i-Y_j)$, $(U_i-U_2)$ and $(V_i-V_j)$ represent, respectively, the difference between the luminances and the blue and red colour signals of each of these two fragments.

Moreover, the invention also relates to a method of grouping the fragments of an image which are obtained by a method according to one of the previous embodiments. This method of grouping uses a model of motion individual to each fragment $F_i$, this model of motion being determined with a known error or variance so as to allocate to the fragment created by this grouping one and the same model of motion.

Thus at each step of this method the two fragments $F_i$ and $F_j$ which minimize a grouping cost $C_{re}$ proportional to an evaluation of the difference between the models of motion of the two fragments $F_i$ and $F_j$ are thus grouped together.

In one embodiment, the grouping cost $(C_{re})$ is inversely proportional to a threshold $S_{re}$ of motion such that, in the absence of any other stoppage test, the grouping is not allowed if the evaluation $\Delta_{i/j}$ is greater than this threshold $S_{re}$.

More precisely, according to one embodiment the grouping cost $C_{re}$ is calculated according to the formula:

$$C_{re} = \frac{Ni \times Nj}{Ni + Nj}[(\Delta_{i/j})/S_{re}],$$

where $N_i$ is the number of pixels of the fragment $F_i$ and $N_j$ is the number of pixels of the fragment $F_j$.

Moreover, in the case where the fragment $F_j$ is of a greater size than the size of the fragment $F_i$, the evaluation $\Delta_{j/i}$ of the difference of motion between these fragments $F_i$ and $F_j$ comprises, for example, the following steps:

calculation of a motion vector for each pixel P (x,y) of the fragment $F_j$ according to the model with parameters $(a_i, b_i, c_i, d_i, e_i, f_i)$ of motion of the fragment $F_i$, in such a way that, for a pixel P with coordinates $(x_j, y_j)$ of $F_j$, we calculate a vector $15_{pj/i}$ with coordinates $(dx_{j/i}, dy_{j/i})$ according to the following formulae:

$dx_{j/i}=a_i+b_ix_j+c_iy_j$ $dy_{j/i}=d_i+e_ix_j+f_iy_j$ evaluation of the motion vector $15_{pj/j}$ of this pixel P according to the model $24_j$ with parameters $(a_i, b_i, c_i, d_i, e_i, f_i)$ of this fragment $F_j$, that is to say $dx_{j/j}=a_j+b_jx_j+c_jy_j$ and $dy_{j/j}=d_j+e_jx_j+f_jy_j$ evaluation of the difference $\Delta p_{j/i}$ between these two vectors $15_{pj/i}$ and $15_{pj/j}$ by calculating $$\Delta p_{j/i} = (dx_{j/j} - dx_{j/i})^2 + (dy_{j/j} - dy_{j/i})^2$$

evaluation $\Delta_{j/i}$ of the difference in motion between fragments $F_i$ and $F_j$ by summing the $\Delta p_{j/i}$ values of all the pixels of the fragment $F_j$ and then by dividing by $N_j$.

In one embodiment of this method of grouping the size of a fragment is defined as the number of pixels included in this fragment.

Moreover, the grouping threshold $S_{re}$ is, preferably, proportional to an error or variance of the modelling of motion of the fragment $F_i$.

According to one model of embodiment, the grouping threshold $S_{re}$ is proportional to the maximum between the variance of the model of motion of the fragment $F_i$ and the mean of the variances of the models of motion of fragments of the image.

In one embodiment, the grouping threshold $S_{re}$ is higher when fragments whose pixels were included in one and the same region of a previous image are grouped together. The grouping is thus less selective in this case.

However, a luminance prediction test can be used before applying a less selective grouping threshold $S_{re}$.

Thus, according to one embodiment, the fragment $F_j$ being of a greater size than the size of the fragment $F_i$, the luminance prediction is performed by calculating, for each pixel P with coordinates $(x_j, y_j)$ of the fragment $F_j$, the vector with coordinates $(dx_{j/i}, dy_{j/i})$, the luminance predicted at P $(x_j, y_j)$ in the current image being that found at $(x_j-dx_{j/i}, y_j-dy_{j/i})$ in the previous image.

Moreover, in order to encourage the grouping of fragments into regions of arbitrary size $N_{min}$, it is possible to use a grouping stoppage test using the grouping cost $C_{re}$ multiplied by a coefficient such that, calling $N'_i$ the maximum between the number $N_i$ of pixels of the fragment $F_i$ and $N_{min}$ and $N'_j$ the maximum between the number $N_j$ of pixels of the fragment $F_j$ and $N_{min}$. In this case, the stoppage test may be written:

$$C_{re}(Fi \cup Fj) * \frac{N'i + N'j}{N'i * N'j} > 1$$

However, it is possible to use another grouping stoppage criterion such as $$C_{re}(Fi \cup Fj) > 1$$

so as not to discourage the grouping of fragments of size greater than $N_{min}$.

Other characteristics and advantages of the invention will become apparent with the description of certain of its embodiments.

DETAILED DESCRIPTION OF PREFERRED EMBODIMENTS

In this description of a preferred embodiment of the invention, use is made of a calculation of the fragment merging cost similar to that described above during the operation 22, that is to say:

$$-\text{Cost}(Fi \cup Fj) = \frac{Ni \times Nj}{Ni + Nj}[(Y_i - Y_j)^2 + (U_i - U_j)^2 + (V_i - V_j)^2]$$

It is found that, in this formula, the cost of merging the two fragments $F_i$ and $F_j$ is equal to the product of factors A and B such that:

$$A = \frac{Ni \times Nj}{Ni + Nj} \text{ and } B = [(Y_i - Y_j)^2 + (U_i - U_j)^2 + (V_i - V_j)^2]$$

Subsequently, in order to use stoppage criterion consistent with a colour difference and luminance difference, two additional steps are introduced:

Initially, the cost of any envisaged merge is multiplied by a factor C consistent with the inverse of a number of pixels.

In a preferred embodiment, $C=2/N_m$, where $N_m$ represents the mean size in pixels of the fragments $F_i$ at a given step of the fragmentation. Stated otherwise, if at a given step of the fragmentation we consider k fragments $F_1, F_2, \ldots F_k$ respectively comprising $N_1, N_2, \ldots$ and $N_k$ pixels; $N_m = (N_1 + N_2 + \ldots + N_k)/K$.

It is understood that the factor C is obtained by considering that $N_i = N_j = N_m$, from which it follows that $$A = \frac{N_m^2}{2N_m} = \frac{N_m}{2};$$

and to obtain $AC=1$, we must have $$C = \frac{2}{N_m}.$$

Subsequently, the product cost $(Fi \cup Fj)*C$, that is to say $A*B*C$, is compared with a fixed threshold $S_c$.

If $A*B*C<S_c$, the deviation in terms of luminance and colours between the two fragments is less than the threshold deviation fixed for stopping the fragmentation. The merge is therefore permitted since the two fragments are sufficiently similar.

If $A*B*C>S_c$, the deviation in terms of luminance and colours between the two fragments is greater than the fixed threshold, the merge is not permitted and the fragmentation is stopped.

Hence, the test for stopping the fragmentation no longer corresponds to a specified number of fragments to be reached, but to an inter-fragment homogeneity threshold beyond which the merges no longer take place.

Thus, as a function of the complexity of the image, the number of regions resulting from the segmentation of the image is variable.

Moreover, by using the term $2/N_m$, which is independent of the fragments considered in the merge, the merging of small fragments is encouraged.

Specifically, the cost of the merge is proportional to the difference in luminance and colours—factor B—and to a factor $A*C$ equal to $(N_i \times N_j/N_i + N_j).2/N_m$.

Owing to this factor $A*C$, if the fragments $F_i$ and $F_j$ have a size less than the mean, this factor is less than 1.

Conversely, if the fragments $F_i$ and $F_j$ have a size greater than the mean, this coefficient $A*C$ is greater than 1 and the cost of the merge is increased.

The threshold of merging $S_c$ is consistent with the square of a luminance difference and/or colour difference. It has been found that a threshold of $3*\Delta^2$, where $\Delta$ represents 6 grey levels on each component, yields satisfactory results.

According to another aspect, the present invention also results from the finding that the grouping of fragments $F_i$ during the operation 30 according to a fixed motion difference criterion does not optimize this merging operation. Specifically, the use of a fixed threshold does not allow good stability of segmentation.

In fact, when processing an image, the motion estimates and their accuracy vary considerably between fragments. For example, a first fragment can be processed with a motion estimation varying between −1 and +1 pixel, with an accuracy of ±0.25 pixels, and a second fragment with a motion estimate varying between −30 and +30 pixels, with an accuracy of ±2 pixels.

It then appears that the use of a fixed threshold, for example for these two estimates, does not optimize the characterization of their motion since this threshold would be unsuitable—too limited and/or too wide—for these fragments.

This is why, in one embodiment, which can be used independently of the other embodiments, a grouping cost $C_{re}$ is calculated which can vary as a function of the fragments concerned and takes account of the evaluation $\Delta_{j/i}$ of the difference between the parametric models of the grouped fragments and a grouping threshold $S_{re}$ related to the variance $Var_{24i}$ of the model of motion of the smallest grouped fragment, as defined previously, and to the prior segmentation of an earlier image.

Subsequently, the possible groupings between fragments $F_i$ and $F_j$ are ranked according to a cost $C_{re}(Fi \cup Fj)$ incurred by their grouping. In this preferred embodiment, this cost $C_{re}(Fi \cup Fj)$ is calculated according to the following formula:

$$C_{re}(Fi \cup Fj) = \frac{Ni \times Nj}{Ni + Nj} * [(\Delta_{i/j})/S_{re}]$$

Thus, it is possible to group together the fragments whose grouping cost is least, that is to say the fragments which are most similar according to the motion criterion, whilst imposing a grouping stoppage threshold $S_{re}$ relating to the difference of motion between the fragments.

The segmentation of the image is then improved since it is dependent on the nature of the image and not on the predetermined number of segments to be reached.

The grouping threshold $S_{re}$ takes account of the fact that, as described previously, the determination of the parametric model $24_j$ of motion of a fragment $F_j$ makes it possible to determine the variance $Var_{24j}$ of this model. Subsequently, this variance represents a margin of tolerance which has to be taken into account when evaluating the similarity of motion between fragments.

Thus, in one embodiment which can be used independently of the other embodiments, the grouping threshold $S_{re}$ is proportional to the variance $Var_{24j}$, this threshold $S_{re}$ being all the higher the larger the variance $Var_{24j}$. Stated otherwise, the greater the uncertainty in the modelling of the motion of a fragment, the greater the threshold $S_{re}$ of tolerance for the grouping.

Thus, when the determination of a parametric model $24_j$ of a fragment $F_i$ causes a large margin of error—$Var_{24j}$—the grouping threshold $S_{re}$ for this fragment $F_i$ takes this approximation into account and is higher, allowing a grouping of this fragment with a lesser demand regarding the similarity of motion.

Nevertheless, it is possible for the grouping threshold to be very low subsequent to a good modelling of the motion of the fragment $F_j$, that is to say when $Var_j$ is low.

In this case, the grouping of the fragment $F_j$ with other fragments is penalized if the grouping threshold is directly proportional to the variance of its model of motion, in which case the threshold would be low.

To avoid this situation, in one embodiment which can be used independently of the other embodiments, at each grouping step, an estimate of the mean $Var_m$ of the variances $Var_{24j}$ of modelling the motion of each fragment $F_j$ is obtained and one grouping threshold for a fragment $F_j$ is fixed at the maximum $Max(Var_{24j}, Var_m)$ between the variance $Var_{24j}$ individual to the grouped fragment and the mean variance $Var_m$.

Empirically, the better results are obtained for a grouping threshold fixed at $0.5*Max(Var_{24j}, Var_m)$.

More specifically, we can consider the grouping between two fragments $F_i$ and $F_j$, these two fragments being the fragments which minimize the grouping cost $C_{re}$ calculated for all the pairs of starting fragments.

By considering the fragment $F_i$ to be smaller than the fragment $F_j$, for example according to a number-of-pixels criterion, the grouping threshold $S_{re}$ is evaluated with a tolerance dependent on the variance $Var_{24i}$.

However, in parallel, the mean variance $Var_m$ of all the starting fragments is evaluated. Thus, if during this step there are k fragments $F_1, F_2, \ldots F_k$ of respective variance $Var_{241}, Var_{242}, \ldots Var_{24k}$, we have:

$$Var_m = (Var_{241} + Var_{242} + \ldots + Var_{24k})/k$$

Subsequently, if this tolerance $Var_m$ is higher than the variance $Var_{24i}$, the threshold $S_{re}$ will be determined as a function of $Var_m$. Thus, the grouping of the fragment $F_i$ is not subjected to a lesser tolerance than in the "mean" case.

Moreover, this grouping threshold $S_{re}$ is evaluated as a function of the prior segmentation of an earlier image.

Specifically, this embodiment, which can be used independently, results from the finding that the operation 26 of comparison between the fragments $F_i$ emanating from the colour fragmentation 22 and the regions $R'_i$ emanating from the previous segmentation of the earlier image $12_i$ makes it possible to simplify the calculations by making predictions with the aid of any correspondences between the segmentation of an image $12_i$ and the fragmentation of the following image.

Specifically, by virtue of this comparison 26, it is possible to determine whether fragments $F_i$ and $F_j$ of the image undergoing processing correspond to zones of the image which were previously grouped together in the previous image, that is to say to one and the same region.

This is why, in an embodiment which can be used independently of the other embodiments, assuming that these fragments are grouped together again, a higher grouping threshold is then fixed in respect of these fragments, thus encouraging their grouping.

For example, this threshold $S_{re}$ can be fixed in the following manner: $S_{re} = 4*Max(Var_m, Var_j)$.

However, it is possible for this assumption to be incorrect, for example when a displacement of objects occurs between two images.

In this case, too high a grouping threshold can encourage a grouping of fragments which do not correspond to objects with the same motion.

To avoid this situation, a condition regarding the variation of luminance of the fragment $F_j$ from the previous image $12_j$ is fixed, making it possible to detect any object motion between the two images.

For example, this condition can be fixed by analysing the luminance predictions.

This luminance prediction, for example associated with the fragment $F_j$ and with the parametric model $24_1$, is defined in the following manner:

At each pixel P with coordinates $(x_j, y_j)$ of the fragment $F_j$, the vector $15_{pj/i}$ with coordinates $(dx_{j/i}, dy_{j/i})$ is calculated as explained previously. Subsequently, the predicted luminance at P $(x_j, y_j)$ in the image $14_i$ is that found at $(x_j-dx_{j/i}, y_j-dy_{j/i})$ in the image $12_i$.

A prediction error is then defined as being the mean of the differences between the predicted luminances and the real luminances of all the pixels P with coordinates $(x_j, y_j)$ of the fragment $F_j$.

Such a luminance prediction error is calculated over a relevant fragment before the grouping thereof and after the grouping thereof with another fragment. The merge is accepted if this prediction error does not vary excessively, the allowed error being dependent on the predetermined resolution.

In this case, it can be assumed that there is correspondence between the fragments $F_i$ and $F_j$ and a higher grouping threshold can be applied.

Empirically, the error between these predictions is fixed at a deviation of seven grey levels.

Taking the above remarks into account, it is apparent that the use of a stoppage criterion according to a calculation of grouping cost $C_{re}$ as defined by the formula:

$$C_{re}(Fi \cup Fj) = \frac{Ni \times Nj}{Ni + Nj}[(\Delta_{i/j})/S_{re}]$$

makes it possible to take account of characteristics individual to each fragment.

Additionally, it is possible to rank the possible groupings according to the cost $C_{re}$ and to encourage the grouping of the fragments which are most similar according to this criterion.

Moreover, it is possible that the user of such a segmentation algorithm may desire preferably to obtain regions of a given size, for example comprising a number $N_{min}$ of pixels.

In fact, in an embodiment which can be used independently of the other embodiments, after each grouping of fragments, a stoppage test which takes this choice into account is applied. For example, by calling $N'_i$ the maximum between the number $N_i$ of pixels of the fragment $F_i$ and $N_{min}$ and $N'_j$ the maximum between the number $N_j$ of pixels of the fragment $F_j$ and $N_{min}$, we impose the condition:

$$C_{re}(Fi \cup Fj) * \frac{N'i + N'j}{N'i * N'j} > 1$$

Subsequently, the term $$\frac{N'i + N'j}{N'i * N'j}$$

encourages the grouping of the fragments of size less than $N_{min}$.

However, this term disadvantages the grouping of fragments of large size.

This is why, in one embodiment, a second grouping stoppage criterion is used alternately with the grouping stoppage criterion described previously. More precisely, a second grouping cost $C'_{re}$ is considered, such that:

$$C'_{re}=[(\Delta_{i/j})/S_{re}].$$

Thus, by using this second grouping cost, it is possible to devise a second stoppage criterion which allows fragments whose difference in motion is less than the grouping threshold to group together.

For example, $C_{re}=[(\Delta_{i/j})/S_{re}]>1$ is imposed as stoppage criterion.

In this embodiment, the use of the two stoppage criteria is alternated in such a way as to obtain a segmentation of the image which does not "penalize" a fragment for its size.

What is claimed is:

1. Method for the fragmentation (F) of images (14i) into homogeneous regions (Ri), this fragmentation (F) using iterative merges of fragments Fi and Fj, among at least 3 fragments in the image, which are as similar as possible according to at least one selection parameter, this similarity being evaluated by a product A*B of two factors A and B, A being consistent with a number of pixels relating to the fragments Fi and Fj and B being consistent with the selection parameter(s), characterized in that a merge is performed when the product A*B*C is less than a threshold consistent with the selection parameters, C being the inverse of a number of pixels per fragment, in the image.

2. Method according to claim 1, characterized in that C is proportional to $2/N_m$ where $N_m$ represents a mean size of the fragments $F_i$, such as a mean number of pixels.

3. Method according to claim 1, characterized in that the selection parameter(s) is (are) at least one of the following parameters: the luminance, the chrominance and the texture.

4. Method according to claim 1, characterized in that each iterative merge relates only to two neighbouring fragments $F_i$ and $F_j$.

5. Method according to claim 4, characterized in that the factor A is proportional to $(N_i*N_j)/(N_i+N_j)$, where $N_i$ and $N_j$ are representative of the size of each merged neighbouring fragment $F_i$ and $F_j$.

6. Method according to claim 5, characterized in that the size of a fragment is the number of pixels included in this fragment.

7. Method according to claim 1, characterized in that the factor B is proportional to $[(Y_i-Y_j)^2+(U_i-U_j)^2+(V_i-V_j)^2]$, where $(Y_i-Y_j)$, $(U_i-U_j)$ and $(V_i-V_j)$ represent, respectively, the difference between the luminances and the blue and red colour signals of each of these two fragments.

8. Method of grouping fragments of an image which are obtained by a method according to claim 1, characterized in that this grouping uses a model ($24_i$) of motion individual to each fragment $F_i$, this model ($24_j$) of motion being determined with a known error or variance ($Var_{24i}$) so as to allocate to the fragment created by this grouping one and the same model ($24k$) of motion, grouping together at each step of this method the fragments $F_i$ and $F_j$ which minimize a grouping cost $C_{re}$ proportional to an evaluation ($\Delta_{i/j}$) of the difference between the models ($24_i$, $24_j$) of motion of the two fragments $F_i$ and $F_j$.

9. Method according to claim 8, characterized in that the grouping cost ($C_{re}$) is inversely proportional to a grouping threshold $S_{re}$ of motion such that, in the absence of any other stoppage test, the grouping is not allowed if the evaluation $\Delta_{i/j}$ is greater than this threshold $S_{re}$.

10. Method according to claim 9, characterized in that the grouping cost $C_{re}$ is calculated according to the formula: $C_{re}=[(N_i \times N_j)/(N_i+N_j)][(\Delta_{i/j})/S_{re}]$, where $N_i$ is the number of pixels of the fragment $F_i$ and $N_j$ is the number of pixels of the fragment $F_j$.

11. Method according to claim 9, characterized in that the grouping threshold $S_{re}$ is proportional to an error or variance $Var_{24i}$ of the modeling ($24_i$) of motion of the fragment $F_i$.

12. Method according to claim 11, characterized in that the grouping threshold $S_{re}$ is higher, the grouping thus being less selective, when fragments whose pixels were included in one and the same region of a previous image are grouped together.

13. Method according to claim 9, characterized in that the grouping threshold Sre is proportional to the maximum Max ($Var_{24i}$, $Var_m$) between the variance ($Var_{24j}$) of the model ($24_j$) of motion of the fragment $F_i$ and the mean ($Var_m$) of the variances of the models of motion of fragments of the image, and preferably equal to $0.5 \times Max$ ($Var_{24i}$, $Var_m$).

14. Method according to claim 8, characterized in that the fragmentation $F_j$ being of a greater size than the size of the fragment $F_i$, the evaluation $\Delta i/j$ of the difference of motion between these fragments $F_i$ and $F_j$ comprises the following steps:

calculation of a motion vector ($15_{pj/i}$) for each pixel $P(x,y)$ of the fragment $F_j$ according to the model $24_i$ with parameters ($a_i$, $b_i$, $c_i$, $d_i$, $e_i$, $f_i$) of motion of the fragment $F_i$, in such a way that, for a pixel P with coordinates ($x_j$, $y_j$) of $F_j$, we calculate a vector $15pj/i$ with coordinates ($d_{xj/i}$, $d_{yj/i}$) according to the following formulae:

$d_{xj/i}=a_i+b_ix_j+c_iy_j$ $d_{yj/i}=d_i+e_ix_j+f_iy_j$ evaluation of the motion vector $15_{pj/j}$ of this pixel P according to the model $24_j$ with parameters ($a_j$, $b_j$, $c_j$, $d_j$, $e_j$, $f_j$) of this fragment $F_j$, that is to say $d_{xj/j}=a_j+b_jx_j+c_jy_j$ and $d_{yj/j}=d_j+e_jx_j+f_jy_j$ evaluation of the difference $\Delta p_{j/i}$ between these two vectors $15_{pj/i}$ and $15_{pj/j}$ by calculating $\Delta p_{j/i}=(d_{xj/j}-d_{xj/i})^2+(d_{yj/j}-d_{yj/i})^2$ evaluation $\Delta_{j/i}$ of the difference in motion between fragments $F_i$ and $F_j$ by summing the $\Delta p_{j/i}$ values of all the pixels of the fragment $F_j$ and then dividing by the number of pixels $N_j$ of the dividing by $F_j$.

15. Method according to claim 14, characterized in that the size of a fragment is defined as the number of pixels included in this fragment.

16. Method according to claim 14, characterized in that a luminance prediction test is used before applying a less selective grouping threshold $S_{re}$.

17. Method according to claim 16, characterized in that the fragment $F_j$ being of a greater size than the size of the fragment $F_i$, the luminance prediction is performed by calculating, for each pixel P with coordinates ($X_j$, $Y_j$) of the fragment $F_j$, the vector $15p_{j/i}$ with coordinates ($dx_{j/i}$, $dy_{j/i}$), the luminance predicted at P ($X_j$, $Y_j$) in the current image being that found at ($X_j-dx_{j/i}$, $Y_j-dy_{j/i}$) in a previous image.

18. Method according to claim 8, characterized in that the grouping of fragments into regions of arbitrary size $N_{min}$ is encouraged by using a grouping stoppage test using the grouping cost $C_{re}$ multiplied by a coefficient such that, calling $N'_i$ the maximum between the number $N_i$ of pixels of the fragment $F_i$ and $N_{min}$, and $N'_j$ the maximum between the number $N_j$ of pixels of the fragment $F_j$ and $N_{min}$, the stoppage test is $C_{re}(F_i U F_j)*[(N'_i+N'_j)/(N'_i*N'_j)]>1$ 19. Method according to claim 8, characterized in that the grouping stoppage criterion is $C_{re}(F_i U F_j)>1$.

* * * * *